United States Patent [19]
Russell

[11] 3,976,025
[45] Aug. 24, 1976

[54] AMPHIBIOUS VEHICLE

[76] Inventor: Raymond Sidney Russell, P.O. Box 191, Norway, Maine 04268

[22] Filed: June 24, 1974

[21] Appl. No.: 482,712

[52] U.S. Cl. .................. 115/1 R; 114/67 R; 115/19; 305/35 EB
[51] Int. Cl.² .................................. B60F 3/00
[58] Field of Search ............ 114/.5 R, 67 R; 115/1 R, 19; 416/4, 5, 7, 85, 86; 305/35 EB, 35 R

[56] References Cited
UNITED STATES PATENTS

| | | | |
|---|---|---|---|
| 1,749,276 | 3/1930 | Edmonds | 115/19 |
| 1,911,546 | 5/1933 | Berger | 305/35 EB |
| 2,941,494 | 6/1960 | McBride | 115/1 R |
| 3,108,564 | 10/1963 | Prosser | 115/1 R |
| 3,376,843 | 4/1968 | Wilson | 416/7 |

FOREIGN PATENTS OR APPLICATIONS

| | | | |
|---|---|---|---|
| 256,796 | 8/1926 | United Kingdom | 305/35 EB |

Primary Examiner—Stephen G. Kunin
Assistant Examiner—Gregory W. O'Connor
Attorney, Agent, or Firm—Townsend and Townsend

[57] ABSTRACT

An amphibious vehicle is adapted to be propelled in water with a minimum of wet hull drag. The vehicle includes a semi-flexible frame and an engine fixed to the frame. Parallel sets of tandem rollers are mounted on the opposite sides of the body on which pairs of pontoon assemblies are mounted. Each pontoon assembly includes a plurality of circumferentially superimposed endless layers or plies of buoyant material so that the pontoons support the body on both land and water. A propulsion device is provided for propelling the load-carrying body in water, the preferred propelling means being a finned belt driven by the engine. An engine is also provided for driving the pontoon rollers so that the linear velocity of the endless layers is approximately equal to the velocity of the body when it passes over water to minimize the occurrence of wet hull drag.

7 Claims, 10 Drawing Figures

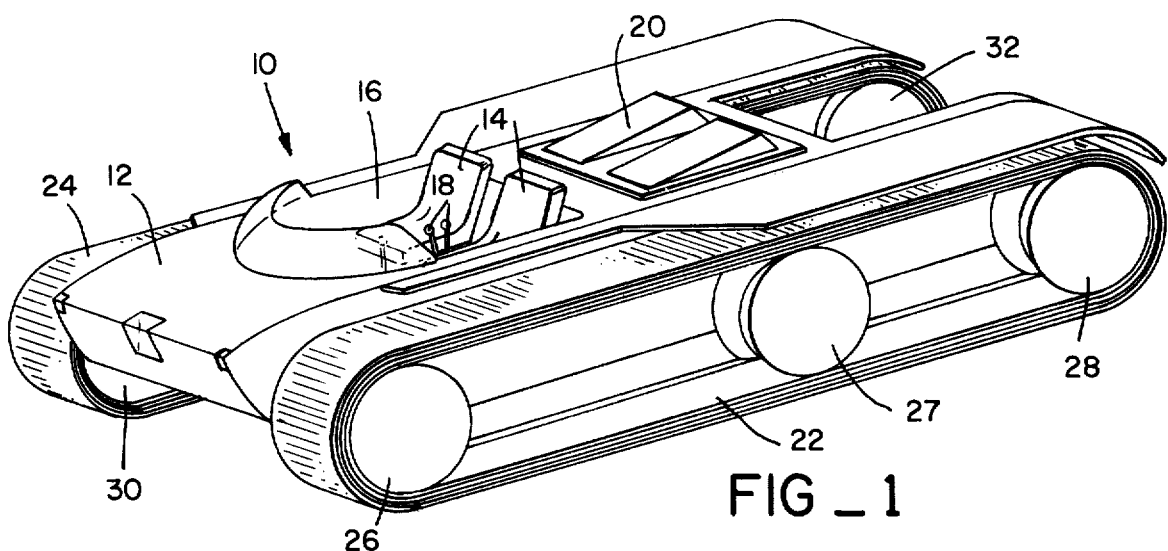
FIG_1
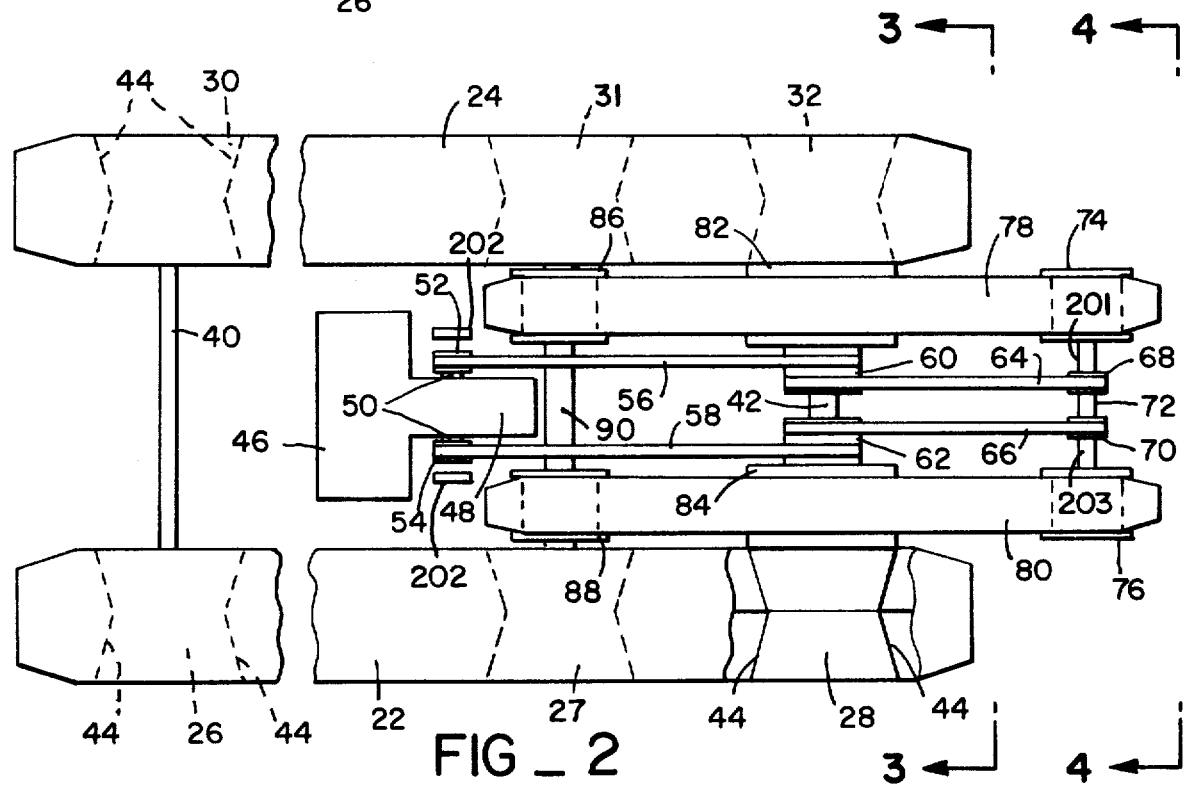
FIG_2
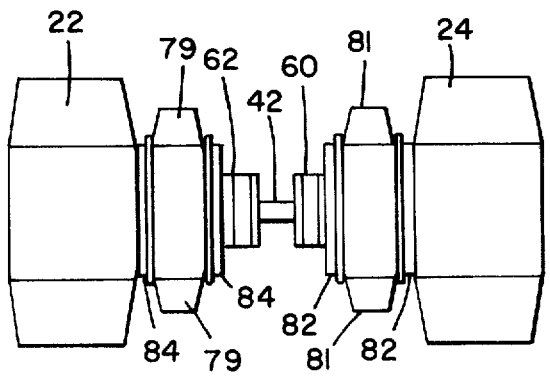
FIG_3
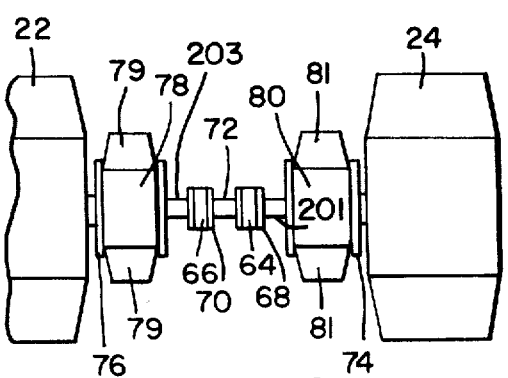
FIG_4

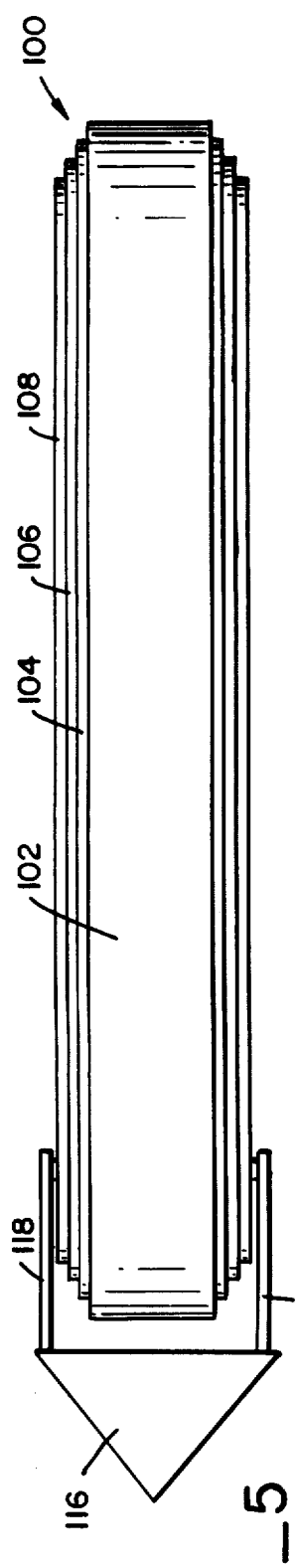
FIG_5
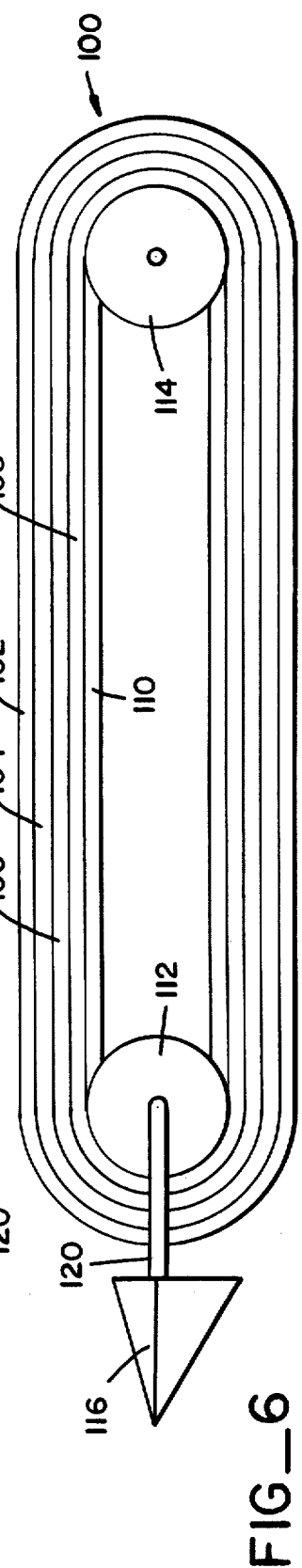
FIG_6
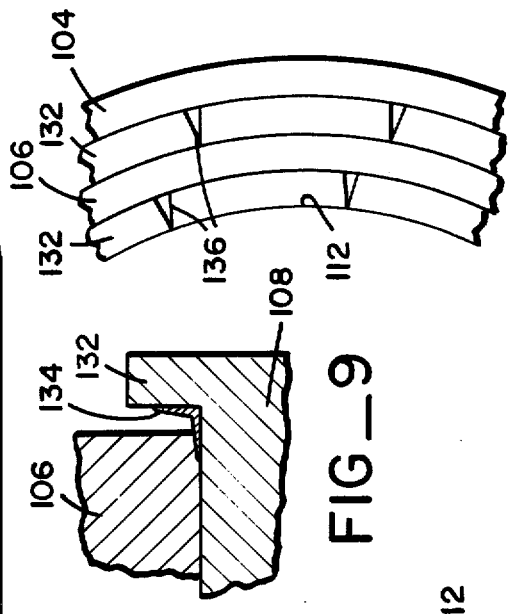
FIG_10 FIG_9 FIG_8 FIG_7

AMPHIBIOUS VEHICLE

BACKGROUND OF THE INVENTION

The present invention relates to amphibious vehicles, an in particular to a type of amphibious vehicle employing parallel endless pontoon assemblies which support the vehicle over both land and water.

The primary problem with amphibious vehicles known in the art is that they are usually an uneasy compromise between land operation and water operation. For example, some amphibious vehicles utilize large buoyant tires which have a plurality of small fins on their surface, and the tires are used to propel the body over both land and water. However, the finned surface of the tires interferes with operation of the vehicle over hard or paved surfaces, and provides only minimal propulsion over water, resulting in a vehicle which is inefficient over both land and water. Another type of vehicle is somewhat similar to the standard automobile but the lower portion of the body is sealed to provide a buoyant hull. The vehicle has standard tires for land propulsion and is provided with a propeller for water propulsion. The vehicle operates much like a standard automobile over land, but in water the exposed tires cause excessive drag and the vehicle is thus inefficient in water. No amphibious vehicle has yet been developed which is efficient over both land and water. As a result, available amphibious vehicles have little practice utility and are used primarily as recreational vehicles for their novelty value. Such vehicles or parts thereof are found in U.S. Pat. Nos. 8,070; 114,832; 328,559; 883,018; 917,351; 953,165; 1,749,276; 1,913,605; and 1,928,511.

SUMMARY OF THE INVENTION

The amphibious vehicle of the present invention includes a load-carrying body containing a power source. A pair of parallel sets of tandem rollers are mounted on opposite sides of the body. At least two substantially parallel endless pontoons are mounted on each set of tandem rollers respectively. Each pontoon is constructed of buoyant material so that the pontoon floats in water as well as providing support for the body over land. Means separate from the pontoon means are provided for propelling the load-carrying body over water. The pontoons are driven by the power source to move the vehicle over land. Furthermore, the pontoons are driven when the vehicle rides over water so that the linear velocity of the pontoons is approximately equal to the velocity of the body to minimize and preclude the generation of wet hull drag.

The primary object of the present invention is to provide an amphibious vehicle which operates efficiently over both land and water. The present invention provides a track vehicle which operates similar to known track vehicles over land. When the vehicle is operated in water, the pontoons are used to minimize wet hull drag so that the vehicle operates highly efficiently in water also. The only impediment to movement of the body in water is the inertial drag due to displacement of the water and the wind resistance of the body.

In the present invention, one of the preferred embodiments utilizes an endless finned belt which acts to propel the vehicle in water, but other propelling means such as propellers, water jets and the like could be used as well.

The pontoons of the present invention are preferably comprised of several plies of buoyant material. The width of the plies decreases proceeding outwardly along the pontoon, and each ply except the outermost has a ridge on each side to confine the next outermost ply in position. The plies are not fixed or glued to each other so that they can slide relative to one another as they are stretched and compressed over the rollers at the ends of the pontoons. The pontoon assemblies of the present invention must be relatively thick to provide the requisite buoyancy. Utilization of a plurality of plies to configure the pontoons allows the use of the relatively thick pontoons without damage to the pontoons as they are stretched over the rollers.

The preferred embodiment of the present invention employs open or closed cell rubber pontoons having a variable density. If desired, the outermost ply can be hard rubber or other rugged material to maximize wear of the pontoon assembly over land. It would be an obvious expedient to provide interchangeable outer layers having a different configurations in order to operate efficiently over different types of terrain.

The innermost ply of the pontoon assembly preferably comprises a triangular belt which fits into a corresponding groove in the rollers. This triangular shape will cause water to run off of the interior of the belt. Furthermore, the water will be forced off the belt by the triangular configuration when the belt encounters one of the rollers. The triangular belt can be constructed of rubber impregnated fabric to provide structural support to the pontoons.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of an amphibious vehicle embodying the apparatus of the present invention;

FIG 2 is a plan view of the apparatus of the present invention with the vehicle body removed.

FIG. 3 is a rear cross-sectional view taken along lines 3—3 of FIG. 2;

FIG. 4 is a rear cross-sectional view taken along lines 4—4 of FIG. 2;

FIG. 5 is a plan view of one of the pontoons of the present invention including a wave cutter;

FIG. 6 is a side elevation view of the pontoon assembly of FIG. 5;

FIG. 7 is a front elevation view of the pontoon assembly shown in FIGS. 5 and 6;

FIG. 8 is a fragmentary cross-sectional elevation view of a preferred embodiment of the pontoon assembly of the present invention FIG. 9 is a blow-up view taken at lines 9—9 of FIG. 8; and FIG. 10 is a fragmentary elevation view of the pontoon assembly of the present invention as it traverses one of the rollers.

DESCRIPTION OF THE PREFERRED EMBODIMENT

FIG. 1 illustrates a hypothetical amphibious vehicle 10 embodying the apparatus of the present invention. Vehicle 10 has a load-carrying body 12 with seats 14 for two individuals. Seats 14 are located in a cockpit areas 16 which has controls 18 for manipulating the vehicle. An air cooled engine is housed in an engine compartment 20 immediately behind the cockpit area 16.

Vehicle 10 is supported by means of pontoons 22, 24 mounted on each side of body 12. Pontoon 22 rides on a plurality of tandem rollers 26, 27 and 28 and pontoon 24 rides on a similar set of rollers 30, 31 and 32. Vehicle 10 includes three rollers such as 26, 27 and 28 on each side of the vehicle in order to support that vehicle, but as few as two rollers and more than three rollers could also be used in appropriate circumstances. Bogey type wheels (not shown) may also be utilized where such a suspension is more appropriate. Each pontoon 22, 24 comprises a plurality of plies of material, and the pontoons support the vehicle body 12 over both land and water. A rigid outer covering can be connected to the outermost ply of pontoons 22, 24 to reduce wear as the vehicle rides over land. The plies of pontoons 22, 24 are of buoyant material, preferably open or closed cell foamed rubber or similar material, so that the pontoon assemblies support the vehicle body 12 in water.

FIGS. 2-4 illustrate the embodiment of FIG. 1 with the body of the vehicle removed. The front pair of rollers 26, 30 which are free turning and principally for support, turn on fixed axle 40 and the rear pair of rollers 28, 32 similarly turn on fixed axle 42. As is apparent from FIG. 2, rollers 26, 28 have outwardly opening V-shaped radial slots formed in the outer surfaces thereof to conform to the inner configuration of the pontoons 22, 24 as will be illustrated hereinafter.

An engine 46, preferably air-cooled, is mounted between pontoons 22 and 24. This engine may be a horizontally opposed four cylinder engine such as is used in the well-known Volkswagen, and has a transaxle 48 pointing toward the aft end of the vehicle. Drive axle 50 emanates from each side of the transaxle 48 and is attached to a set of drive sprockets 52, 54. A pair of drive chains 56, 58 are driven sprockets 52, 54 respectively and drive in turn two corresponding double sprockets 60, 62 on axle 42. These double sprockets 60, 62 are connected to aft rollers 28, 32 to drive the rollers and thereby drive endless pontoons 22, 24.

A pair of chains 64, 66 is also attached to double sprockets 60, 62 respectively. These chains 64 and 66 are driven by sprockets 60 and 62 respectively and in turn drive sprockets 68 and 70 mounted on axles 201 and 203 to drive rollers 74 and 76. A coupling 72 connects shafts 201 and 203. Timing belts 78 and 80 (commonly called positive drive belts) have a plurality of fins 79 and 81 disposed along the outer periphery of each to provide thrust to propel the craft. The return rollers 86 and 88 turn on fixed axle 90 to support the forward end of the finned timing belts 78 and 80.

Thus, it can be seen that drive rollers 74 and 76 mounted on axles 201 and 203 turn at the same speed as the drive axles 50 of the transaxle 48. In this embodiment sprockets 60 and 62 are twice the size of sprockets 52 and 54 so that there is a 2 to 1 reduction ratio, the drive sprockets 60 and 62 turning at one-half the R.P.M. of the drive sprockets 68 and 70. As a result drive rollers 74 and 76 turn at double the R.P.M. of aft rollers 28 and 32 thus driving the finned belts 78 and 80 at the same surface speed (expressed in feet per minute) as the pontoons 22 and 24.

When the vehicle of the present invention is operated in water, finned belts 78, 80 provide for virtually the entire propulsion of the vehicle. Pontoons 22, 24 are also driven when the vehicle rides in water in order to prevent the formation of wet hull drag on the pontoons. Such wet hull drag is caused by friction between the relatively stationary water and the parts of the vehicle in contact with the water. Moving the pontoons at the same speed as the body eliminates relative movement between the water and the portion of the vehicle in contact with the water to virtually eliminate wet hull drag in the vehicle of the present invention.

In FIG. 2, the details of the mechanism for controlling the speed of each pontoon independently are shown. Each of a pair of disc type brakes 202 are mounted on the axles 52 and 54 of the transaxle 48. Applying one of the brakes will stop all rotation of the pontoon and the finned belt on that side of the craft, while permitting those on the other side to continue to move. The brakes may be actuated when the vehicle is in water or on land, although a rudder should be used for more effective steering in water.

A preferred embodiment of the pontoon assembly 100 of the present invention is illustrated by way of reference to FIGS. 5-7 in combination. Pontoon assembly 100 includes a plurality of endless plies 102-110. Plies 102-108 have a generally rectangular cross section with the exception of side tabs which will be illustrated in more detail hereinafter. However, interior ply 110 has a triangular configuration so as to fit into the outwardly directed V-shaped slot in rollers 112, 114. A wave cutter 116 is mounted on shafts 118, 120 which are in turn attached to leading roller axle 112. Wave cutter 116 has a central knife edge 122 and a pair of convex surfaces 124, 126 extending from the knife edge so that waves will be dispersed by the wave cutter and will not impact upon the leading end of the endless plies.

The actual configuration of the various plies of pontoon assembly 100 are illustrated in more detail by way of reference to FIG. 8. Endless ply 110, the innermost of the endless plies 102-110, is V-shaped to conform to the outwardly directed slot 130 of each roller such as 112. Each subsequent ply 108, 106 and 104 with the exception of the outermost ply 102 has a generally rectangular configuration but also includes tabs 132 on each side to provide a groove for the next outermost ply to confine it in position. In order to minimize wear on the endless plies, an angular member 134 can be provided to space each next outermost ply from the tabs 132 as illustrated in FIG. 9.

Endless plies 102-108 are preferably constructed of either natural or synthetic foamed rubber which are capable of being formed into a closed cell material. Such material should contain approximately 85% air and 15% rubber to give the material a density of 5-10 pounds per cubic foot, resulting in a buoyancy of approximately 55 pounds per cubic foot. Endless plies 102-108 are not mounted or connected to one another in order that they may compress, slip, and stetch with respect to one another as they pass around the rollers at the ends of the pontoons. In order to minimize friction wear caused by this relative movement, which I call creep, the plies can be reinforced on their abutting surfaces with thin belted elastomers, fibers, plastics or a combination of these materials if necessary.

The innermost ply 100 is preferably constructed from a rubber impregnated fabric to give flexible structural support to the vehicle. As a result, the innermost ply 110 will have a substantially higher density than the outer plies. In addition, plies 102–108 can be constructed of materials of varying densities so that the density of the plies decreases from the innermost ply 108 to the outermost ply 102. If necessary, a layer of relatively tough material may be installed as a protective skin on the outer surface of the outermost ply 102 or it may be provided with a protective tread so that wear of the pontoon is minimized as the vehicle travels over land. Also, it is apparent that different types of outer plies 102 may be provided to adapt to different usages and that these plies may be interchanged when the vehicle is used primarily as a water vehicle or primarily as a land vehicle.

One of the problems encountered with the pontoon assembly 100 of the present invention is that when the plies stretch over the rollers such as 112, the thickness of the plies themselves results in substantial stretching and compressing thereof. In order to minimize the effects of such stretching and compressing, tabs 132 can be split as illustrated at 136 so that these tabs may freely expand about the rollers. However, in order to maintain the integrity of the plies themselves, no slits are provided except in tabs 132.

The plies of pontoon assembly 100 may also comprise a single ply of buoyant material circumferentially superimposed in layers 102–110, each layer being in overlying relationship to the layer beneath it, the single ply forming a unitary pontoon in which the layers are slideable with respect to each other.

The elimination of wet hull drag achieved by the present invention, and the efficient powering of the vehicle over both land and water, results in a substantial saving in the use of fuel. This saving is enhanced by the lightweight construction of the draft and the use of a small, lightweight engine. The efficiency of the vehicle results in a corresponding reduction in pollution as well. Hence, the present invention provides a highly useful vehicle, but one which can be operated in today's environment.

While a preferred embodiment of the present invention has been illustrated in detail, it is apparent that modifications and adaptations of that invention will occur to those skilled in the art. However, it is to be expressly understood that such modifications and adaptations are within the spirit and scope of the present invention as set forth in the following claims:

What I claim as new is:

1. An amphibious vehicle adapted to be propelled in water with a minimum of wet hull drag, said vehicle comprising:

a load-carrying body;

power output means fixed to said body;

pontoon means comprising at least two substantially parallel endless pontoons, said parallel endless pontoons comprising a plurality of endless plies of buoyant material, the plies of each said pontoon being circumferentially superimposed to form said endless pontoon, one of the pontoons mounted on each side of the body, each said pontoon being constructed of buoyant material to support the load-carrying body in the water;

first means for propelling the load-carrying body in water, said propelling means being powered by the power output means; and second means powered by the power output means for driving the pontoons at a speed corresponding to the linear velocity of the body over water, created by said propelling means, to minimize wet hull drag.

2. A vehicle as recited in claim 1 wherein the width of each of the successive plies forming the said pontoon decreases from the innermost ply to the outermost ply to form two endless pontoons having an outwardly decreasing tapered cross section.

3. A buoyant pontoon assembly for an amphibious vehicle, said pontoon assembly comprising:

at least two tandemly mounted rollers;

a plurality of circumferentially superimposed plies of buoyant material mounted on said rollers, each said ply having a narrower width than the next outermost ply, each said ply except the outermost ply having a pair of tabs on the opposite sides of the outer surface thereof to provide a groove so that the next outermost ply fits into said groove and is confined between the tabs, each said ply being independent of each other ply so that the plies can creep with respect to one another as the plies pass over each of the rollers so that a relatively thick pontoon assembly having high buoyancy is provided for the amphibious vehicle.

4. A buoyant pontoon assembly as recited in claim 3 wherein the tandemly mounted rollers have an outwardly directed V-shaped groove in the outer surface thereof, and additionally comprising an interior ply having a triangular configuration complementary to the slots in the rollers, said triangular ply mounted interior to the circumferentially superimposed plies of buoyant material so that water splashed on the interior surface of the plies flows off the sides of the triangular ply.

5. A buoyant pontoon assembly as recited in claim 3 wherein the buoyant material is a single continuous ply circumferentially superimposed in layers, with layers overlying each other and slideable with respect to each other.

6. An amphibious vehicle adapted to be propelled over water with a minimum of wet hull drag, said vehicle comprising:

a load-carrying body;

an engine fixed to said body;

a pair of parallel sets of tandem rollers mounted on opposite sides of the body, each said roller having an outwardly directed V-shaped groove in the outer surface thereof;

pontoon means comprising at least two essentially parallel endless pontoons, one of the pontoons mounted on each set of tandem rollers respectively, each said pontoon comprising a set of circumferentially superimposed plies of buoyant material, the innermost ply having a V-shaped cross section complementary to the V-shaped slot in the rollers, said plies being constructed of buoyant material so that the pontoon means supports the load-carrying body over both land and water;

a finned belt including an endless portion and a plurality of outwardly directed fins attached to said endless portion;

means for mounting the endless portion of the finned belt to the body so that the fins along a portion of the length of said endless portion project into the water when the vehicle floats in water;

means for driving the endless portion of the finned belt so that the fins thereof propel the load-carrying body in the water;

means powered by the engine for driving at least one of the rollers of each said set so that the linear velocity of the pontoons is approximately equal to the velocity of the body over water to minimize wet hull drag, said driving means adapted to propel the load-carrying body over land.

7. An amphibious vehicle adapted to be propelled in water with a minimum of wet hull drag, said vehicle comprising:

a load-carrying body;

power output means fixed to said body;

pontoon means comprising at least two substantially parallel endless pontoons, one of the pontoons mounted on each side of the body, each said pontoon being constructed of buoyant material to support the load-carrying body in the water;

first means for propelling the load-carrying body in water, said propelling means being powered by the power output means;

second means powered by the power output means for driving the pontoons at a speed corresponding to the linear velocity of the body over water, created by said propelling means, to minimize wet hull drag; and including tandemly mounted rollers comprising fore and aft pairs of rollers having a common axle connecting each said pair, one of the endless pontoons being mounted on one fore and one aft roller respectively and the other of the endless pontoons being mounted on the other fore and aft rollers, each of said rollers having an outwardly V-shaped radial slot formed in the outer surface thereof, said pontoon means being additionally provided with two generally parallel endless plies mounted on respective fore and aft rollers of the roller means, said endless plies having a V-shaped configuration complementary to the V-shaped slot in the rollers whereby each said pontoon is superimposed on one of the V-shaped plies.

* * * * *